(12) United States Patent
Reinheimer et al.

(10) Patent No.: US 12,007,047 B2
(45) Date of Patent: Jun. 11, 2024

(54) RESTRAINED PIPE COUPLING

(71) Applicant: Robar Industries Ltd, Surrey (CA)

(72) Inventors: Jonathan Reinheimer, Vancouver (CA); Corbin Turner, Langley (CA)

(73) Assignee: ROBAR INDUSTRIES LTD., Surrey (CA)

( * ) Notice: Subject to any disclaimer, the term of this patent is extended or adjusted under 35 U.S.C. 154(b) by 111 days.

(21) Appl. No.: 17/848,846

(22) Filed: Jun. 24, 2022

(65) Prior Publication Data
US 2023/0417347 A1    Dec. 28, 2023

(51) Int. Cl.
*F16L 25/06*    (2006.01)
*F16L 21/00*    (2006.01)
*F16L 21/06*    (2006.01)

(52) U.S. Cl.
CPC ........... *F16L 21/065* (2013.01); *F16L 21/007* (2013.01)

(58) Field of Classification Search
CPC ......... F16L 17/02; F16L 17/06; F16L 23/024; F16L 21/007; F16L 25/06; F16L 25/065; F16L 25/08; F16L 55/17; F16L 55/1705; F16L 55/171; F16L 55/1715
See application file for complete search history.

(56) References Cited

U.S. PATENT DOCUMENTS

| | | | |
|---|---|---|---|
| 4,092,036 A | 5/1978 | Kabushiki | |
| 4,627,774 A | 12/1986 | Bradley | |
| 4,779,900 A | 10/1988 | Shumard | |
| 4,896,903 A | 1/1990 | Shumard | |
| 5,544,922 A | 8/1996 | Shumard | |
| 9,810,356 B2 * | 11/2017 | Maeda | F16L 23/003 |
| 2016/0033066 A1 * | 2/2016 | Patriarca | F16L 25/065 |
| | | | 29/434 |

FOREIGN PATENT DOCUMENTS

WO    2014/106749    7/2014

* cited by examiner

*Primary Examiner* — Aaron M Dunwoody
(74) *Attorney, Agent, or Firm* — Jeffer Mangels; Butler & Mitchell LLP; Brennan C. Swain, Esq.

(57) ABSTRACT

A restrained pipe coupling includes a restraining gland assembly having an annular main body with multiple gripper units movably connected to the annular main body. Each gripper unit includes a gripper housing having a bottom sliding surface, a gripper bolt fixedly secured to the gripper housing and radially movable through a gripper opening in the annular main body and fixable at different positions, and a gripper body having a top sliding surface and a bottom gripping surface. The sliding surfaces of the gripper housing and the gripper body are in slidable contact and angled between 20 and 30 degrees from the axial direction of the annular main body.

22 Claims, 6 Drawing Sheets

RESTRAINED PIPE COUPLING

FIELD

This disclosure relates generally to restrained couplings for pipes.

BACKGROUND

One type of known pipe fitting is a restrained coupling, which is a type of mechanical coupling connecting a plain end of a pipe to another pipe. Another type of restrained fitting is a restrained flange coupling adaptor for connecting a plain end pipe to a flanged end pipe or other flanged component. Such restrained fittings provide flexibility to connections by allowing some pipe misalignment, and are useful to connect pipes of certain materials such as high density polyethylene (HDPE) and polyvinyl chloride (PVC).

Some restrained couplings are particularly useful to resist axial displacement caused by unbalanced hydrostatic thrust forces in a pipe section e.g. from directional or diameter changes in the pipeline. The axial hydrostatic force of a pipeline is the product of the internal pressure of the pipeline and the cross-sectional area of a pipe section. A change in direction or diameter in the pipeline will generate an unbalanced thrust force. When a pipeline is buried in soil and the directional or diameter change is gradual, the thrust forces are normally counterbalanced by the friction between the pipe and the soil; however, when there are higher pressures, poor soil conditions or significant changes of direction in the pipeline, the thrust forces are typically too great to resist without mechanical assistance.

Some types of known restrained couplings use radially extending gripping means to grip the outside wall of a pipe to provide mechanical restraint against thrust forces. For example, a typical restrained flange coupling has multiple circumferentially-spaced gripping means each comprising a radially-extending threaded bolt with gripping teeth at a distal end; the bolt can be radially extended inwards until the teeth contact the outside wall of the plain end pipe and apply radial pressure thereto. The frictional force between the teeth and pipe wall provide axial resistance to unbalanced thrust forces. These radially-extending gripping means are typically unitary bodies, or comprise multiple components securely fixed together, and are usually set in place in a fixed position at the time of installation. Once the pipeline is buried under the surface, the gripping means are no longer accessible and their position cannot be changed.

After installation, a pipeline can be subject to conditions that cause the pipe wall to shift relative to the restrained coupling thereby reducing the grip there-between, and ultimately leading to leakage and/or pipe failure. WO/2014/106749 proposes a pipe fitting with a gripping means having gripping members that can be selectively moved relative to guide means within a predetermined range, purportedly to allow for relative movement between the pipeline and the fitting after pipeline installation while maintaining the gripping effect of the gripping means on the pipeline. However, the pipe fitting disclosed in this patent publication features a number of deficiencies including limited thrust load resistance, limited working range with different pipe diameters, a tendency to rotate and become misaligned, and can come apart in use.

It is therefore desirable to provide a solution to at least some of the existing challenges faced by prior art devices. In particular, it is desirable to provide a restrained pipe coupling that has at least one of improved thrust loading resistance, greater working range and improved anti-rotation performance compared to prior art devices.

SUMMARY

According to one aspect of the invention, there is provided a restrained pipe coupling for coupling a plain pipe end to another pipe component. The restrained pipe coupling comprises a restraining gland assembly having an annular main body with circumferentially-spaced and radially-facing gripper openings; and multiple gripper units movably connected to the annular main body. Each gripper unit comprises a gripper housing having a bottom sliding surface, a gripper bolt fixedly secured to the gripper housing and radially movable through one of the gripper openings and fixable at different positions relative to the annular main body, and a gripper body having a top sliding surface and a bottom gripping surface. The sliding surfaces of the gripper housing and the gripper body are in slidable contact and angled between 20 and 30 degrees from the axial direction of the annular main body. In particular, the sliding surfaces can be angled at about 25 degrees from the axial direction of the annular main body.

The restrained pipe coupling can further comprise a flanged center sleeve connected to the restraining gland assembly and having an annular flange with circumferentially-spaced and axially-facing flange bolt openings. Alternatively, the restrained pipe coupling can further comprise a second restraining gland assembly and a center sleeve connected at either end to both of the restraining gland assemblies.

The sliding surfaces can have a continuous flat face extending along the length of the sliding surfaces. One of the sliding surfaces can comprise a channel and the other of the sliding surfaces can comprise an elongated rib that is slidable in the channel such that the sliding surfaces are substantially constrained to translate in a sliding direction. One of the gripper housing and gripper body can also comprise a pair of grooved side walls, and the other of the gripper housing and gripper body comprises a pair of tongues slidable along the grooved side walls in the sliding direction, that also serve to substantially constrain the sliding surfaces to slide in the sliding direction One of the gripper housing and the gripper body can comprise at least one side wall and the other of the gripper housing and gripper body can comprise a stopper positioned to contact an edge of the at least one side wall when the gripper body has reached a selected sliding limit relative to the gripper housing.

The annular main body can have a channel with angled side walls, in which case the gripper housing has a chamfered top surface mating with the angled channel side walls such that the gripper units are seated in the channel when in a retracted position.

DETAILED DESCRIPTION OF EMBODIMENTS

Embodiments disclosed herein relate generally to a restrained pipe coupling comprising a restraining gland assembly having a set of gripper units that are extendible radially inwardly to grip a plain pipe end. Each gripper unit has two portions that are angled and slidable relative to each other and which allow the gripper units to compensate for relative movement of two pipeline components while maintaining sufficient grip to provide unbalanced thrust force resistance.

Figure 1:
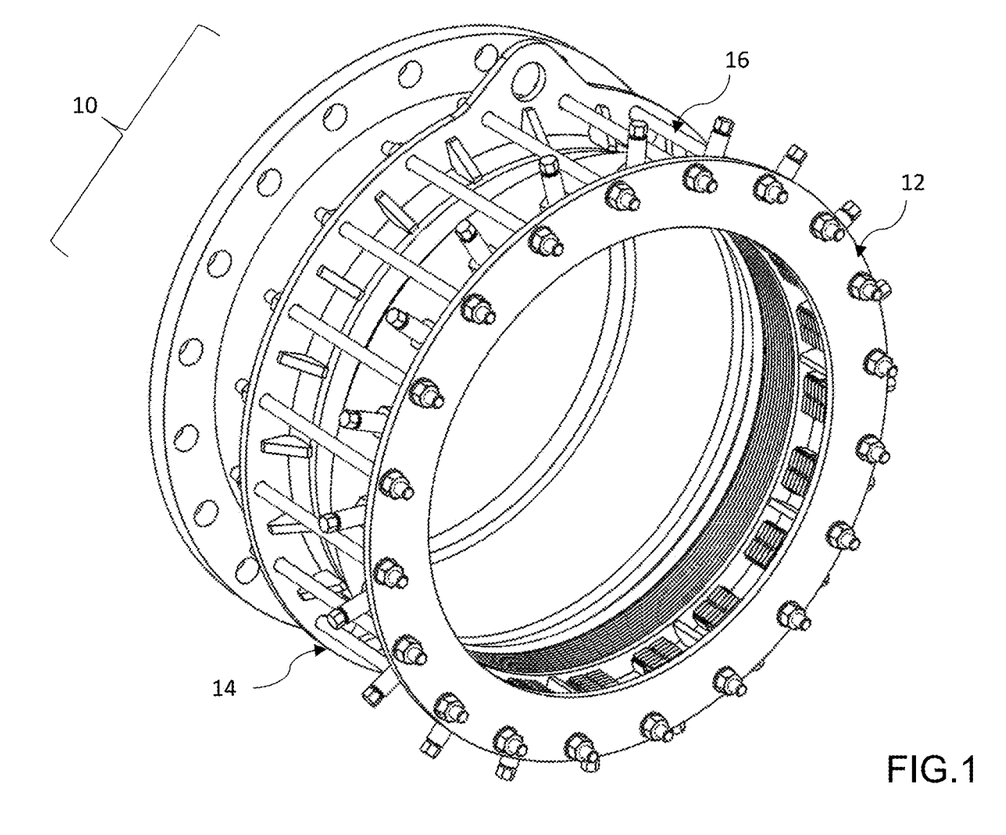
FIG. 1 is a perspective view of a restrained flange coupling adapter according to one embodiment, comprising a restraining gland assembly with multiple gripper units, and a flanged center sleeve connected to the restraining gland assembly by tie rods.
Figure 6:
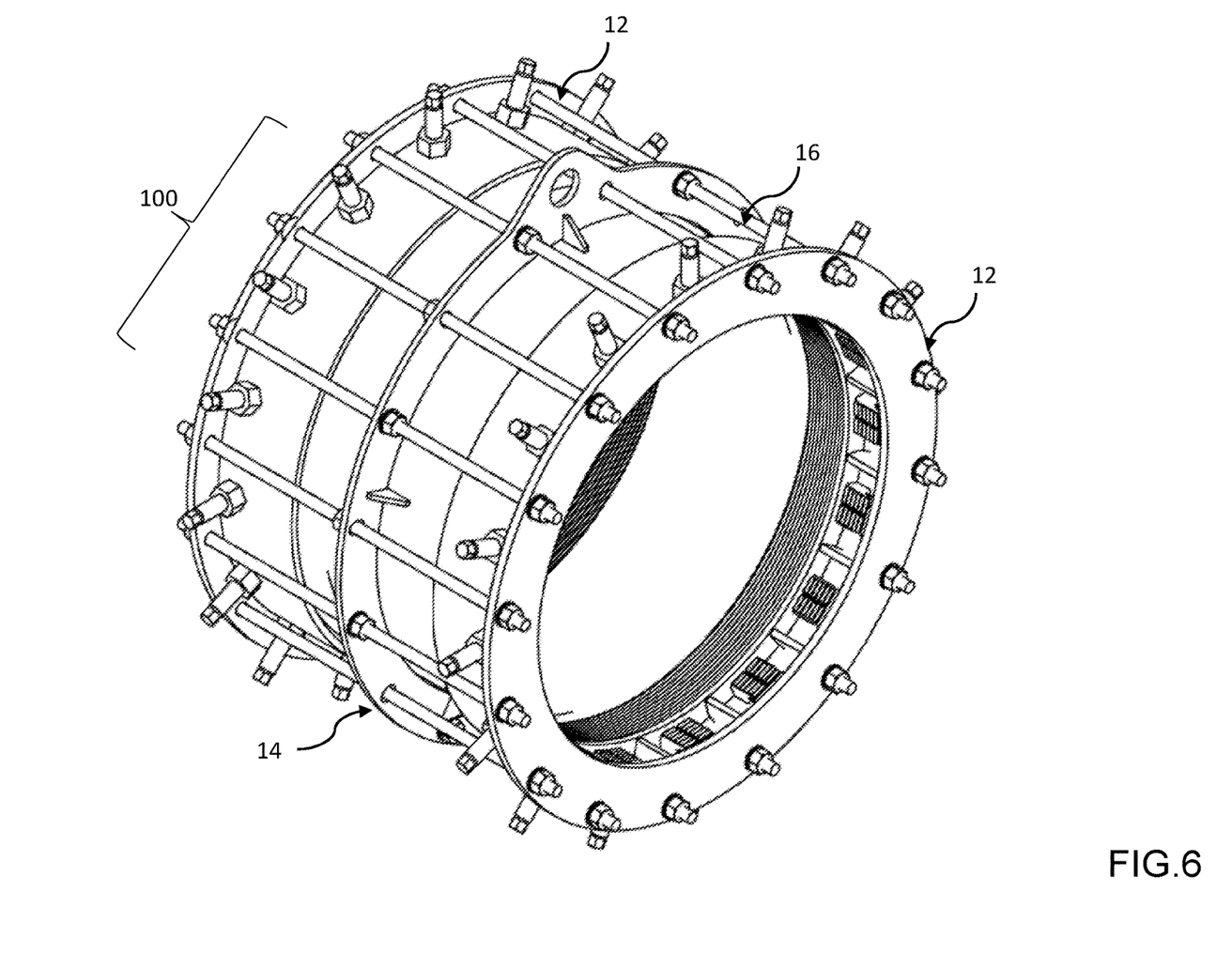
FIG. 6 is a perspective view of restrained flange coupling according to another embodiment, comprising a pair of restraining gland assemblies at each end of a flanged center sleeve.

The embodiment shown in FIG. 1 is a restrained flange coupling adapter 10 that is suitable to connect a plain end of a pipe to a flanged pipe, fitting or other flanged component, and which generally comprises a restraining gland assembly 12 and a flanged center sleeve 14 connected to the restraining gland assembly 12 by tie rods 16. Other embodiments include a restrained coupling 100, as shown in FIG. 6, for coupling two plain pipe ends, and which generally comprises a center sleeve flanked by a pair of connected restraining gland assemblies. Such a restrained coupling is useful for joining plain end pipes of the same or dissimilar materials, such as HDPE pipe, ductile iron pipe, and PVC pipes, or for joining a plain end pipe with a flexible restrained connection or other restrained pipe component.

Figure 2:
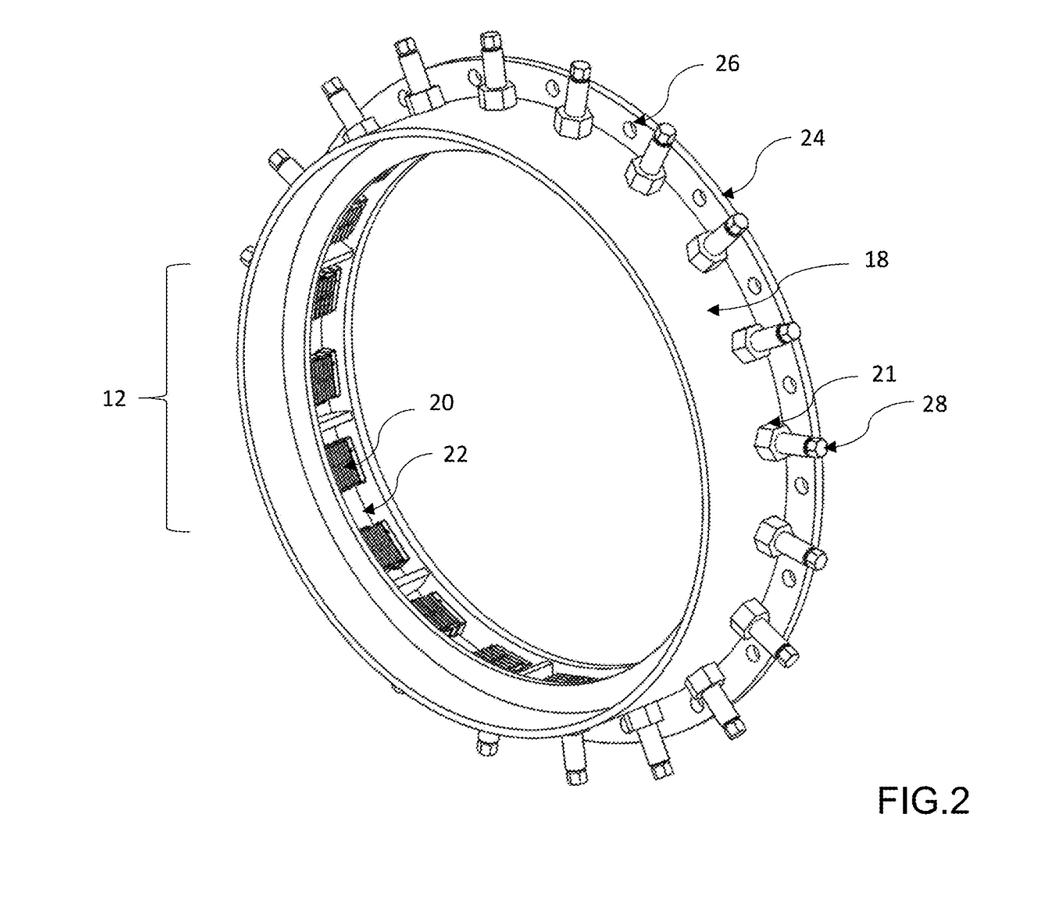
FIG. 2 is a perspective view of the restraining gland assembly with multiple gripper units extendible radially inwards from an annular main body.

Referring to FIG. 2, the restraining gland assembly 12 comprises an annular main body 18 and multiple radially inwardly extendible gripper units 20. The annular main body 18 has a series of circumferentially-spaced radially-facing gripper openings 21 for receiving a gripper bolts 28 of the gripper units 20. In this embodiment, the gripper openings 21 and gripper bolts 28 are matingly threaded to allow the gripper units 20 be fixed in different radial positions relative to the annular main body 18. Alternatively, other known securing means for securing the gripper units 20 to the annular main body 18 in different positions can be substituted.

The gripper units 20 extend into a channel 22 that circumscribes the interior surface of the annular main body 12. In some embodiments the channel can have straight walls and in some other embodiments the channel 22 can have angled walls. The gripper units 20 are seated in the channel 22 in a retracted position and can be extended radially inwards into an extended position to grip a pipe end (not shown). An annular flange 24 extends radially outwards from the annular main body 18 and comprises a set of circumferentially-spaced and axially-facing tied rod openings 26 for receiving tie rods (not shown) that attach the gland assembly 12 to the rest of the flange coupling 10.

Figure 3A:
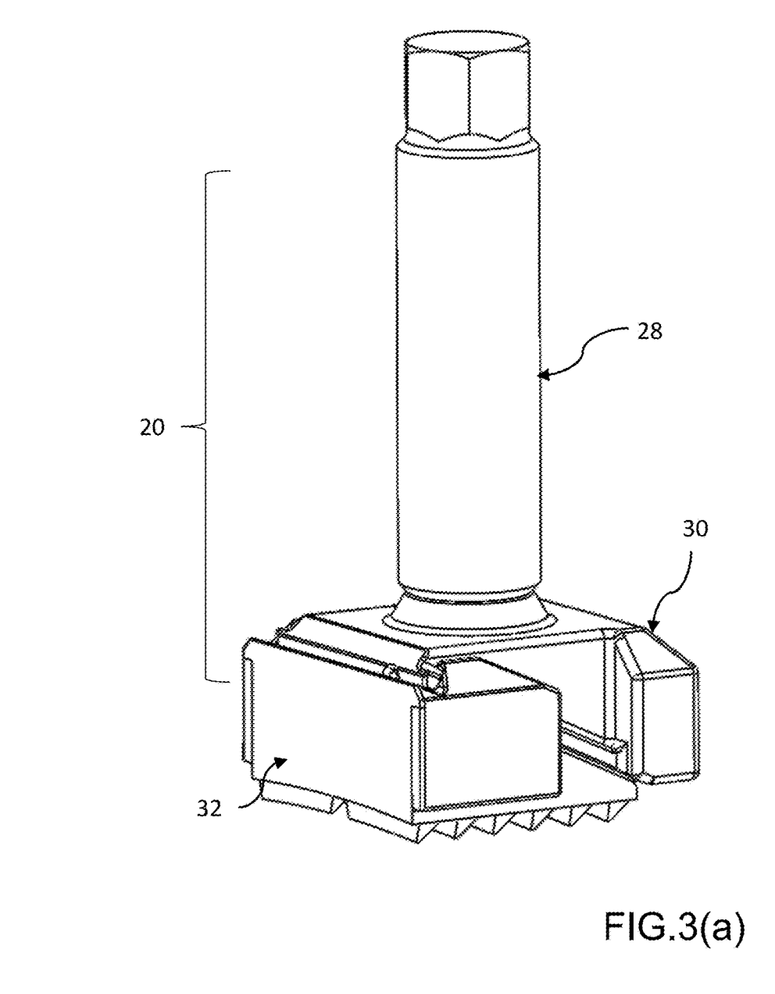
FIGS. 3(a) and 3(b) are two perspective views of a gripper unit comprising a gripper housing, gripper body, and gripper bolt (FIG. 3(a) only).
Figure 3B:
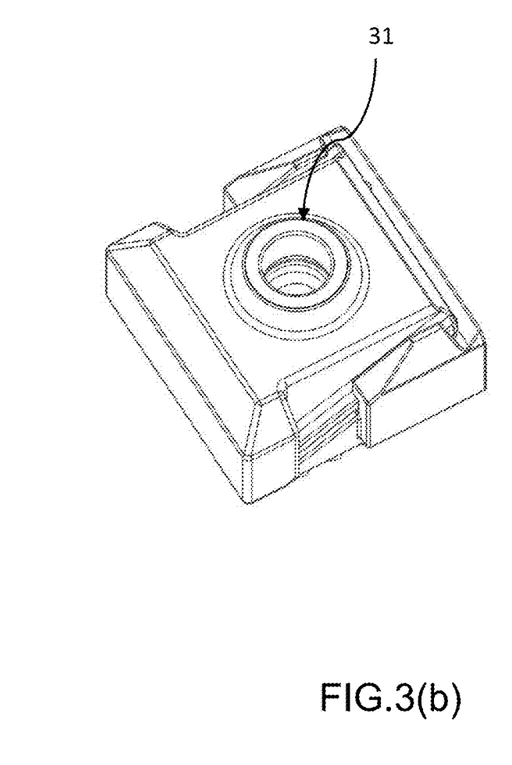
Figure 4A:
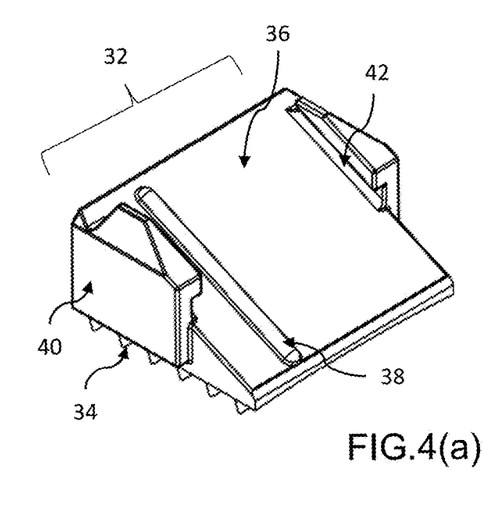
FIGS. 4(a) to (e) are respective top perspective (FIG. 4(a)), bottom perspective (FIG. 4(b)), top plan (FIG. 4(c)), rear elevation (FIG. 4(d)) and A-A sectioned view (FIG. 4(e)) of the gripper body.
Figure 4B:
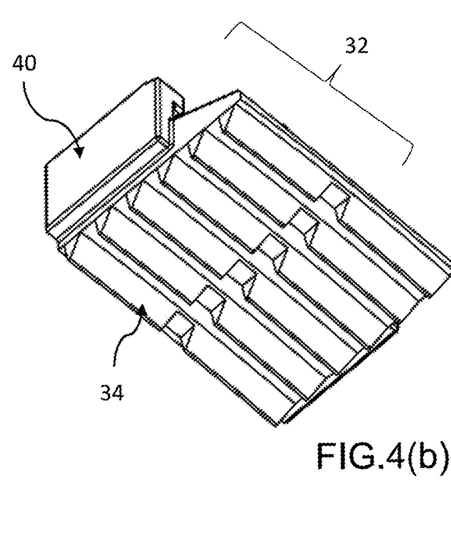
Figure 4C:
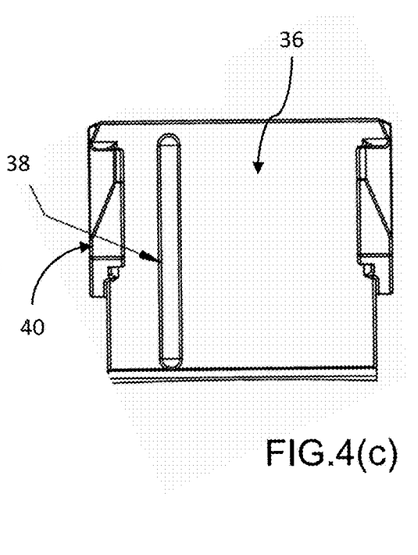
Figure 4D:
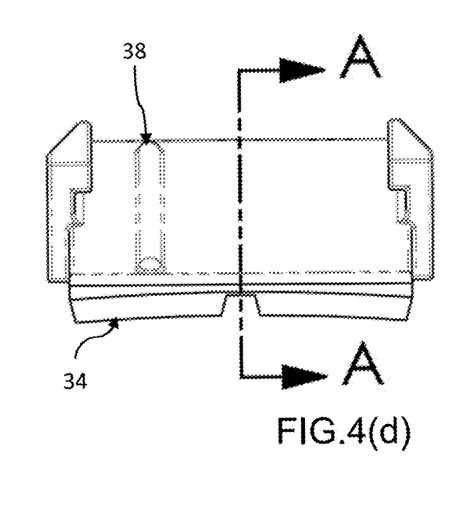
Figure 4E:
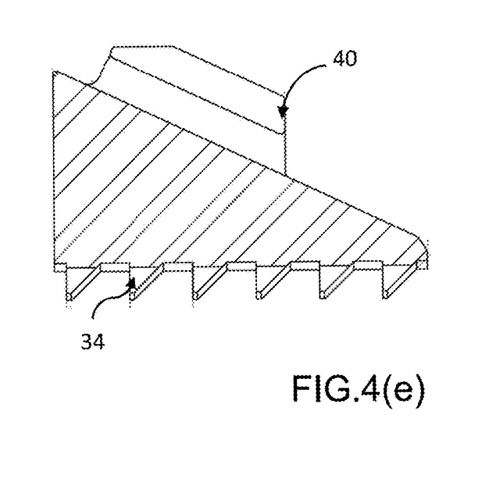
Figure 5A:
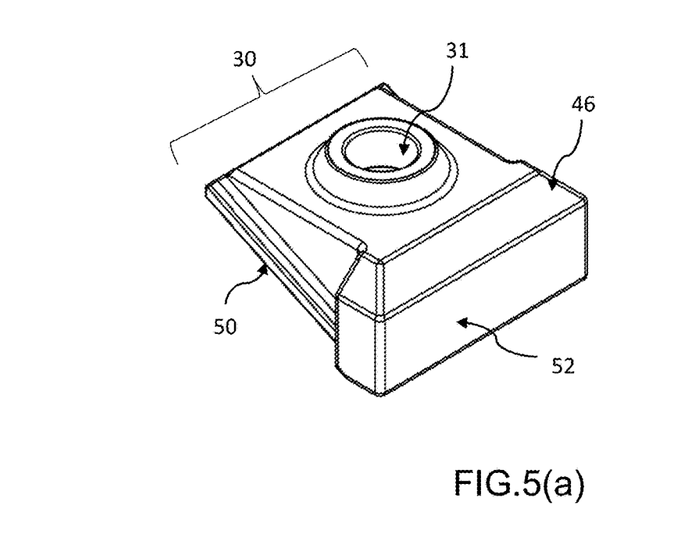
FIG. 5(a) to (d) are respective top perspective (FIG. 5(a)), bottom perspective (FIG. 5(b)), front elevation (FIG. 5(c)), and A-A sectioned view (FIG. 5(d)) of the gripper housing.
Figure 5B:
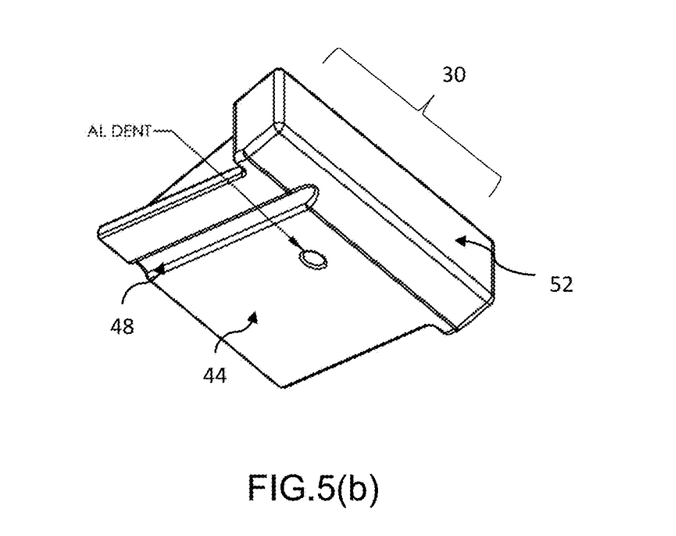
Figure 5C:
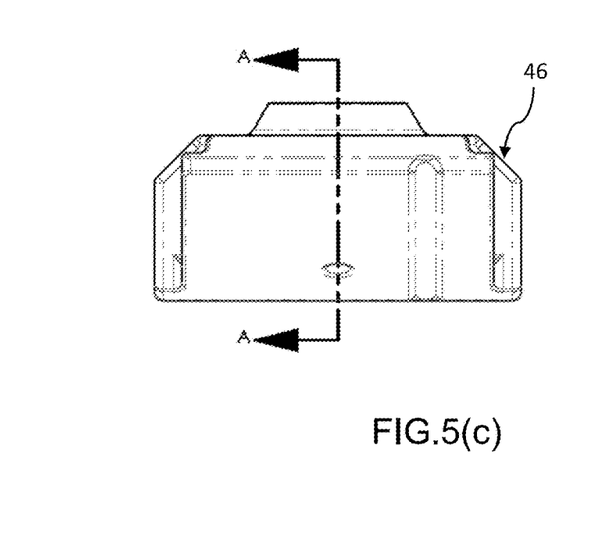
Figure 5D:
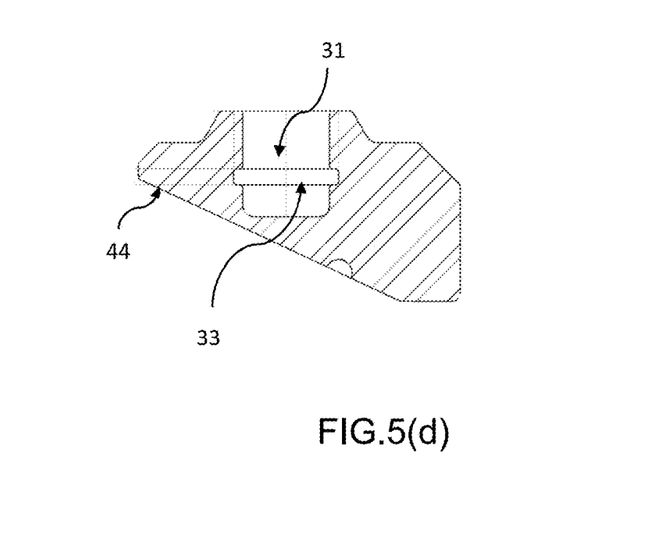

Referring now to FIGS. 3(a) and (b), each gripper unit 20 generally comprises a gripper housing a gripper body 32, and a gripper bolt 28. A distal end of the gripper bolt 28 is fixed to a top surface of the gripper housing 30. In the illustrated embodiment, the distal end is inserted into an opening 31 on the top surface of the gripper housing 30 and secured by an O-ring (not shown). The gripper bolt 28 spigots into the gripper housing 30, wherein a bolt spigot 33 is an O-ring groove that houses the O-ring (see FIG. 5(d)). Alternatively, the gripper bolt 28 can be secured to the gripper housing by other known means, e.g. welding, retaining clip, or by threaded connection. The gripper bolt 28 has a generally cylindrical threaded outer surface (threads not shown) that mate with threads in a corresponding gripper opening 21. The bottom face of the gripper housing 30 has a sliding surface that slidably mates with a sliding surface on the top face of the gripper body 32 at an angle of about 25° from the axial direction ("sliding angle"). As will be discussed further below, it has been found that increasing the sliding angle reduces the radial load and increases the axial load, and the gripper units 20 can be designed with a sliding angle that corresponds to the operating conditions in which the restrained pipe coupling 10 is intended to be used. In particular, it is expected that providing gripper units 20 with sliding surfaces with have a sliding angle between 20° and 30° are suitable to provide mechanical restraint for plain pipe ends subject to typical unbalanced axial thrust forces, e.g. between 8,000 to 10,000 pounds per gripper.

Referring now to FIGS. 4(a)-(e), the gripper body 32 in some embodiments are investment castings and composed of stainless steel 316. However, it will be apparent to those skilled in the art that the gripper body 32 can be manufactured by other known techniques and using other known suitable materials. The gripper body has a bottom face with a plurality of transversely extending teeth 34, and a top face with an angled sliding surface 36. The teeth 34 have a curvature that is compatible with target pipe having a range of diameters; for example, in the illustrated embodiment the teeth curvature has a 12" radius. An elongated rib 38 extends along the length of the sliding surface 36 in a sliding direction. A pair of side walls 40 extend upwardly from each side of the sliding surface 36 and partially along the length of the gripper body 32; a groove 42 extends along an inside surface of each side wall 40 at the same angle as the sliding surface 36.

Referring now to FIGS. 5(a)-(d), the gripper housing 30 in some embodiments are investment castings and composed of stainless steel 316, and are nitride case-hardened to prevent galling. However, it will be apparent to those skilled in the art that the gripper housing 30 can be manufactured by other known techniques and using other known suitable materials. The gripper housing 30 has a bottom face with an angled sliding surface 44, and a top surface with a top surface protrusion with the opening 31 for connecting to the gripper bolt 28. In this embodiment the channel 22 of the restrained gland assembly 12 has angled side walls, and the gripper housing has a top surface with chambered edges 46 which mate with the angled side walls and enable the gripper housing 30 to securely seat within the channel 22.

The gripper housing 30 has a channel 48 that extends along the length of the sliding surface 44 in the sliding direction, and is designed to slidably receive the elongated rib 38 thereby minimizing rotation of the gripper body 32 relative to the gripper housing 30.

The side edges of the sliding surface 44 extend beyond the side walls of the gripper housing 30 to form tongues 50 that are slidable within the grooves 42 of the gripper body side walls 40. The sliding engagement of the tongues 50 and grooves 42, along with the sliding engagement of the elongated rib 38 and the gripper housing channel 48 substantially constrain the sliding of the gripper body 32 and gripper housing 30 to the sliding direction. A stopper 52 extends laterally across the rear end of the gripper housing 30 and slightly beyond each tongue 50; the stopper 52 engages with the rear edges of the gripper body side walls 40, thereby providing an outer limit to the sliding range of the gripper body 32 relative to the gripper housing 30.

In an alternative embodiment, the locations of the tongues 50 and grooves 42 are reversed, i.e. the tongues are provided on the gripper body and the grooves are provided on side walls extending from the gripper housing.

In an another alternative embodiment, the locations of the elongate rib 38 and gripper channel 48 are reversed, i.e. the elongated rib is provided on the gripper housing and the gripper channel is provided on the gripper body.

EXAMPLE

A prototype restrained pipe coupling was built and tested with increasing axial loads to simulate increasing unbalanced thrust forces in a pipeline. The prototype restrained pipe coupling had the following specifications:
  Gripper body: 316 stainless steel investment castings,
  Gripper housing: 316 stainless steel investment castings, housing nitride-case hardened
  Restrained gland assembly: 20 gripper units per gland
  Gripper sliding surface angle: 25°
  Gripper bolt thread: ⅞"

The prototype coupling was connected to a 24.00" HDPE test pipe with a wall thickness of 1.4". Gripper units were installed with a radial torque of 100 ft-lbs. Pipe pressure was progressively increased, and the prototype coupling was observed to withstand a pressure of 350-psi before the pipe failed. This finding compared favorably to known restrained pipe couplings which failed at 200-psi or less.

The terminology used herein is for the purpose of describing particular embodiments only and is not intended to be limiting. Accordingly, as used herein, the singular forms "a", "an" and "the" are intended to include the plural forms as well, unless the context clearly indicates otherwise. It will be further understood that the terms "comprises" and "comprising," when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", and "coupling" as used in this description are intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections.

As used herein, a reference to "about" or "approximately" a number or to being "substantially" equal to a number means being within +1-10% of that number.

It is contemplated that any part of any aspect or embodiment discussed in this specification can be implemented or combined with any part of any other aspect or embodiment discussed in this specification.

The scope of the claims should not be limited by the preferred embodiments set forth in the examples, but should be given the broadest interpretation consistent with the description as a whole.

What is claimed is:

1. A restrained pipe coupling comprising:
    a restraining gland assembly comprising
      an annular main body with circumferentially-spaced and radially-facing gripper openings; and
      multiple gripper units movably connected to the annular main body, each gripper unit comprising a gripper housing having a bottom sliding surface, a gripper bolt fixedly secured to the gripper housing and radially movable through one of the gripper openings and fixable at different positions relative to the annular main body, and a gripper body having a top sliding surface and a bottom gripping surface,
    wherein the sliding surfaces of the gripper housing and the gripper body are in slidable contact and angled between 20 and 30 degrees from an axial direction of the annular main body; and
    wherein one of the gripper housing and gripper body comprises at least one side wall and the other of the gripper housing and gripper body comprises a stopper positioned to contact an edge of the at least one side wall when the gripper body has reached a selected sliding limit relative to the gripper housing.

2. The restrained pipe coupling as claimed in claim 1 wherein the sliding surfaces of the gripper housing and the gripper body are angled at about 25 degrees from the axial direction of the annular main body.

3. The restrained pipe coupling as claimed in claim 1 wherein one of the sliding surfaces comprises a channel and the other of the sliding surfaces comprises an elongated rib slidable in the channel such that the sliding surfaces are substantially constrained to translate in a sliding direction.

4. The restrained pipe coupling as claimed in claim 1 wherein one of the gripper housing and gripper body comprises a pair of grooved side walls, and the other of the gripper housing and gripper body comprises a pair of tongues slidable along the grooved side walls such that the sliding surfaces are substantially constrained to translate in a sliding direction.

5. The restrained pipe coupling as claimed in claim 1 wherein the annular main body has a channel with angled side walls, and the gripper housing has a chamfered top surface mating with the angled side walls of the channel such that the gripper units are seated in the channel when in a retracted position.

6. The restrained pipe coupling as claimed in claim 1 wherein the sliding surfaces have a continuous flat face extending along the length of the sliding surfaces.

7. The restrained pipe coupling as claimed in claim 1 further comprising a flanged center sleeve connected to the restraining gland assembly, and comprising an annular flange with circumferentially-spaced and axially-facing flange bolt openings.

8. The restrained pipe coupling as claimed in claim 1 wherein the restrained gland assembly is a first restraining gland assembly, and the restrained pipe coupling further comprising a second restraining gland assembly and a center sleeve connected at each end to the first and second restraining gland assemblies.

9. The restrained pipe coupling as claimed in claim 1 wherein the bottom gripping surface of the gripper body comprise multiple curved and transversely-extending teeth.

10. The restrained pipe coupling as claimed in claim 1 wherein the gripper body and gripper housing are composed of 316 stainless steel.

11. The restrained pipe coupling as claimed in claim 10 wherein the gripper housing is nitride-case hardened.

12. A restrained pipe coupling comprising:
a restraining gland assembly comprising
an annular main body with circumferentially-spaced and radially-facing gripper openings; and
multiple gripper units movably connected to the annular main body, each gripper unit comprising a gripper housing having a bottom sliding surface, a gripper bolt fixedly secured to the gripper housing and radially movable through one of the gripper openings and fixable at different positions relative to the annular main body, and a gripper body having a top sliding surface and a bottom gripping surface,
wherein the sliding surfaces of the gripper housing and the gripper body are in slidable contact and angled between 20 and 30 degrees from an axial direction of the annular main body; and
wherein the annular main body has a channel with angled side walls, and the gripper housing has a chamfered top surface mating with the angled side walls of the channel such that the gripper units are seated in the channel when in a retracted position.

13. The restrained pipe coupling as claimed in claim 12 wherein the sliding surfaces of the gripper housing and the gripper body are angled at about 25 degrees from the axial direction of the annular main body.

14. The restrained pipe coupling as claimed in claim 12 wherein one of the sliding surfaces comprises a channel and the other of the sliding surfaces comprises an elongated rib slidable in the channel such that the sliding surfaces are substantially constrained to translate in a sliding direction.

15. The restrained pipe coupling as claimed in claim 12 wherein one of the gripper housing and gripper body comprises at least one side wall and the other of the gripper housing and gripper body comprises a stopper positioned to contact an edge of the at least one side wall when the gripper body has reached a selected sliding limit relative to the gripper housing.

16. The restrained pipe coupling as claimed in claim 12 wherein one of the gripper housing and gripper body comprises a pair of grooved side walls, and the other of the gripper housing and gripper body comprises a pair of tongues slidable along the grooved side walls such that the sliding surfaces are substantially constrained to translate in a sliding direction.

17. The restrained pipe coupling as claimed in claim 12 wherein the sliding surfaces have a continuous flat face extending along the length of the sliding surfaces.

18. The restrained pipe coupling as claimed in claim 12 further comprising a flanged center sleeve connected to the restraining gland assembly, and comprising an annular flange with circumferentially-spaced and axially-facing flange bolt openings.

19. The restrained pipe coupling as claimed in claim 12 wherein the restrained gland assembly is a first restraining gland assembly, and the restrained pipe coupling further comprising a second restraining gland assembly and a center sleeve connected at each end to the first and second restraining gland assemblies.

20. The restrained pipe coupling as claimed in claim 12 wherein the bottom gripping surface of the gripper body comprise multiple curved and transversely-extending teeth.

21. The restrained pipe coupling as claimed in claim 12 wherein the gripper body and gripper housing are composed of 316 stainless steel.

22. The restrained pipe coupling as claimed in claim 21 wherein the gripper housing is nitride-case hardened.

\* \* \* \* \*